Figure 1:
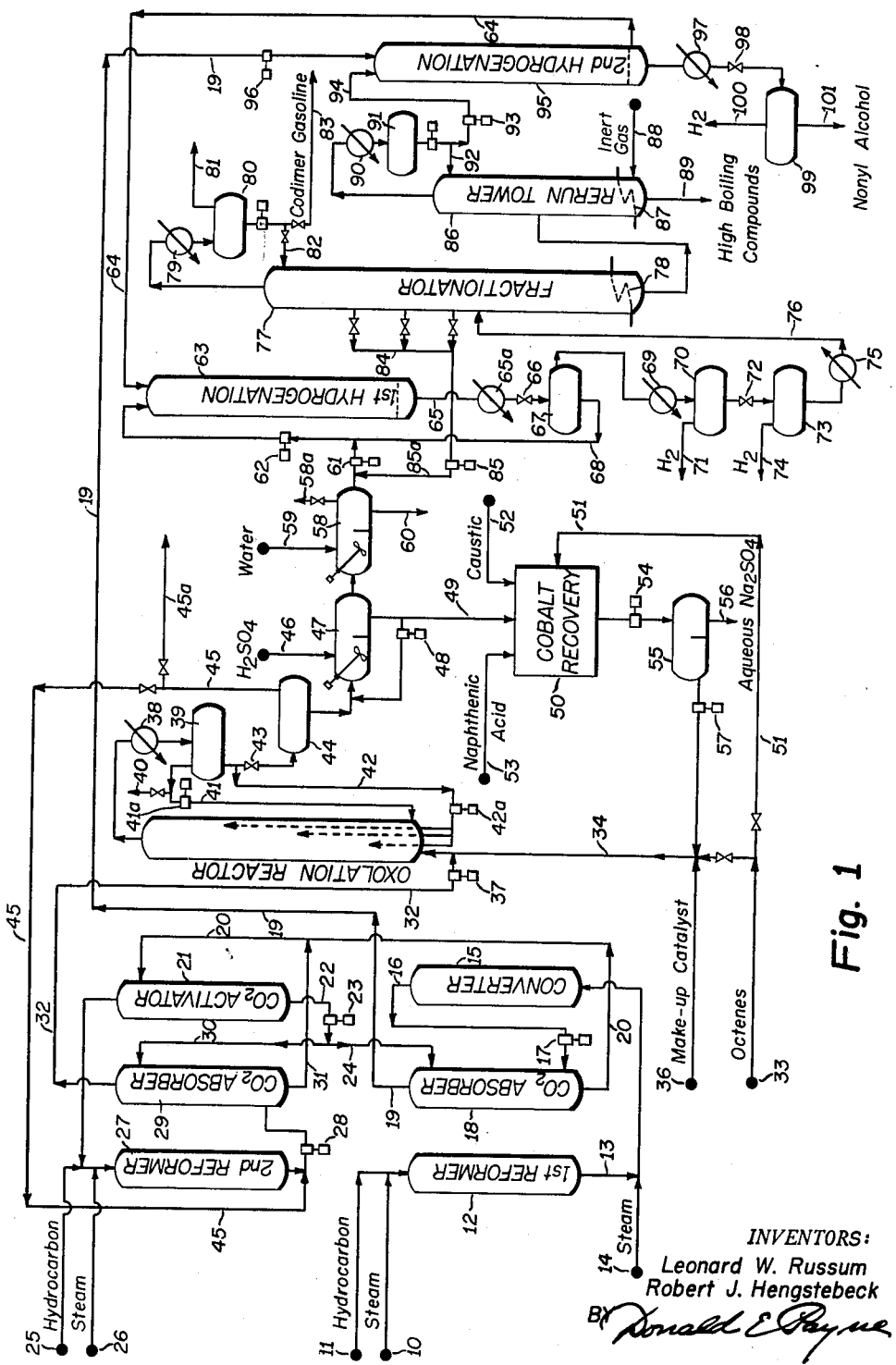

Dec. 27, 1955

L. W. RUSSUM ET AL 2,728,798

PRODUCTION OF HIGH MOLECULAR WEIGHT
ALCOHOLS BY IMPROVED OXO PROCESS

Filed March 16, 1953

2 Sheets-Sheet 1

INVENTORS:
Leonard W. Russum
Robert J. Hengstebeck
BY Donald E. Payne
ATTORNEY

United States Patent Office 2,728,798
Patented Dec. 27, 1955

2,728,798

PRODUCTION OF HIGH MOLECULAR WEIGHT ALCOHOLS BY IMPROVED OXO PROCESS

Leonard W. Russum, Highland, and Robert J. Hengstebeck, Valparaiso, Ind., assignors to Standard Oil Company, Chicago, Ill., a corporation of Indiana Application March 16, 1953, Serial No. 342,566

8 Claims. (Cl. 260—638)

This invention relates to improvement in production of high boiling alcohols and it pertains more particularly to improved methods and means for producing high boiling alcohols which are substantially free from aldehydes and from other impurities which have heretofore contaminated such alcohols when produced by the so-called oxo process. This is a continuation-in-part of our co-pending application Serial No. 246,368, filed September 13, 1951, now U. S. Patent No. 2,638,487, which, in turn, was a continuation-in-part of our parent application Serial No. 20,786 filed April 13, 1948 (now abandoned).

In the oxo process an olefin, such for example as a heptene or an octene, is reacted with carbon monoxide and hydrogen at high pressure in the presence of a carbonyl-forming metal catalyst such as cobalt to yield an aldehyde with one more carbon atom per molecule. This reaction is referred to as oxolation and it is accompanied by side reactions which include a certain amount of hydrogenation to form alcohols, aldehyde polymerization and formation of relatively high boiling products of indeterminate composition. The second step of the oxo process is the hydrogenation of products produced in the first step primarily to convert the aldehyde into alcohol after which the hydrogenated products are fracionated into an alcohol fraction (nonyl alcohol when the charged olefin is an octene), a lower boiling hydrocarbon fraction and a higher boiling fraction. An object of the invention is to provide improvements in the oxo process whereby product degradation is reduced to a minimum and whereby maximum yields of high quality products may be obtained with minimum investment and operating costs. Another object is to provide improved methods and means of catalyst utilization, recovery and reuse. Still another object is to increase the effectiveness of hydrogen utilization.

A further object of the invention is to provide methods and means for controlling reaction conditions in the oxolation and hydrogenation steps. Another object is to provide an improved method and means for retarding or inhibiting the conversion of aldehydes and/or alcohols to paraffins in the hydrogenation step. Other objects will be apparent as the detailed description of the invention proceeds.

To accomplish the above objects sources of $H_2$—$CO$ and $H_2$ are required. Thus a normally gaseous hydrocarbon may be reacted with steam in a multiple reformer system, the products of the first reformer being passed through a converter with additional steam to produce a gas consisting essentially of hydrogen and carbon dioxide. This carbon dioxide may be separated and reacted with hydrocarbons and steam in a second reformer to produce carbon monoxide and hydrogen in a ratio of about 1:1 together with carbon dioxide which is separated and recycled. The hydrogen produced in the first reformer and converter, after removal of $CO_2$, will usually contain about .5 per cent to 2 per cent of carbon monoxide; such carbon monoxide may be removed by methanation or other known means to a level below 0.1 per cent.

The 1:1 hydrogen-carbon monoxide mixture (ratios as high as 1.5:1 may be used) is passed through an oxolation reaction zone together with an aliphatic olefin containing 3 to 15 or more carbon atoms per molecule, for example a mixture of heptenes or octenes, in the presence of an oxolation catalyst such as cobalt under conditions to effect substantial oxolation, i. e. conversion of octene to nonyl aldehyde. Where the charge is a mixture of olefins obtained by polymerization of a mixture of n-butenes and isobutylene, the olefins which do not react are generally characterized by highest octane numbers and are the most valuable components for motor fuel. Oxolation may be effected by operating at 2500–4000, i. e. about 3000 p. s. i. at a temperature of about 250 to 400° F., e. g. about 330° F., with a liquid space velocity (volumes of fresh liquid per hour per volume of reactor space) of about 0.15 to 1.5, e. g. about 0.5, employing about 0.01 to 0.2, e. g. about 0.1 weight per cent catalyst as cobalt (supplied as an oil-soluble cobalt salt such as a cobalt naphthenate solution) and about 20 to 50 or more, preferably about 25 to 40 cubic feet of hydrogen-carbon monoxide gas (in addition to recycle gas) per gallon of olefin charged. For oxolation of butylene the amount of hydrogencarbon monoxide gas may be up to about 80, and for oxolation of $C_{15}$ olefins as low as about 15 cubic feet per gallon. The preferred operating conditions above defined result in a total olefin conversion of about 50 per cent (37–75 per cent), an aldehyde to alcohol ratio of about 3:1 (1:1 to 5:1), an aldehyde-plus-alcohol to bottom or polymer ratio of about 3:1 (2:1 to 17:1) and olefin saturation of about 7 per cent (0 to 10 per cent). Oxolation temperature is stabilized by the large liquid content of the reactor and may be controlled in any known manner, preferably to cooling reactor effluent, separating and recycling product liquid at spaced vertical points in the reactor and recycling gas to the base thereof.

The liquid product of the ovolation step, after gases are released therefrom and after catalyst has been removed therefrom by acid and water washing, may next be subjected to a first hydrogenation step under conditions for converting most of the nonyl aldehydes to nonyl alcohols with minimum conversion of alcohols to hydrocarbons. This hydrogenation may be effected by trickling the oxolation product over supported cobalt or copper chromite catalyst at a temperature of about 350 to 550° F., e. g. about 450° F. and a pressure of about 500 to 3000 p. s. i. g., e. g. about 850 p. s. i. g., in the presence of hydrogen which may be from the final hydrogenation step. To remove the heat of hydrogenation a substantial part of the hydrogenated product is cooled and recycled, the recycle ratio in this case being about 1:1 to 3:1. This recycle not only safeguards against undue temperature rise in the event the olefins undergo hydrogenation but it represses or inhibits conversion of aldehydes and/or alcohols to paraffins.

Under preferred operating conditions the oxolation step may effect sufficient hydrogenation to avoid the necessity of employing a first hydrogenation step. When the catalyst is removed from the liquid oxolation products by acid wash and the acid is thoroughly removed by water or dilute caustic wash, these products may be steam distilled under reduced pressure a short contact time to remove polymer as bottoms, to remove overhead, if desired, at least a part of the unconverted and saturated olefins and to provide as a charge for final hydrogenation a heart cut of $C_8$ aldehyde and alcohol.

When a first hydrogenation step is employed, the oxolation product stream after acid washing to remove cobalt and a first hydrogenation to increase alcohol content, may be fractionated to remove most of the unreacted hydrocarbons (chiefly codimer and particularly olefins wherein he double bond is between tetrtiary carbon atoms) and to remove all materials lower boiling than the desired alcohols but it is particularly important to effect removal of materials higher boiling than the desired alcohols. The alcohol product thus obtained may contain about .5 to 3 per cent of nonyl aldehydes. Such impure nonyl alcohol is subjected to a final hydrogenation step by trickling it over a hydrogenation catalyst such as copper chromite or a supported cobalt catalyst at a temperature of about 300 to 500° F. or more, and a pressure of about 500 to about 3000, in the presence of the hydrogen produced as hereinabove described. A large excess of hydrogen may be introduced into the final hydrogenation reactor and under the described conditions substantially all of the aldehydes are converted into alcohol without appreciably reducing the alcohol to hydrocarbons. The unconsumed hydrogen from the final hydrogenation step may thereafter be employed in the first hydrogenation step. The product produced by the final hydrogenation step is an alcohol of high purity which contains substantially less than .5 per cent of aldehyde and which is substantially free from discoloration or color forming materials. At some sacrifice in product yield, the second hydrogenation step may be omitted and the fractionation may be effected at such low pressure as to give a product of good color and low aldehyde content.

When no first hydrogenation step is required (except the hydrogenation which is inherently effected in the oxolation reactor), the liquid products from the oxolation reactor are freed from catalyst by washing with dilute sulfuric acid followed by water washing and the substantially neutral organic liquid thus obtained is steam distilled under reduced pressure with a short contact time to eliminate polymers, i. e. materials higher boiling than the desired alcohols, as a bottoms fraction and preferably to eliminate unreacted and saturated olefins as an overhead fraction so that the final hydrogenation step, as in the other example, is effected with an aldehyde-alcohol charging stock which is free from materials higher boiling than the alcohol and from which at least a part of the olefins has been removed. The steam distillation may be effected in the presence or absence of a buffer and should be effected with a preheat temperature and tower bottom temperature sufficiently low and with sufficiently short contact time and reduction in pressure to enable the fractionation to be performed without any serious product degradation. An auxiliary heat carrier and/or stripping medium such as recycled olefins may be added to the stream in the place of or in addition to steam before the stream is preheated and introduced into the distillation tower.

An important feature of our invention is the recovery and reuse of oxolation catalyst. The oxolation product is washed with sulfuric acid of about 10 per cent concentration to convert all cobalt metal and cobalt compounds contained therein into cobalt sulfate which is removed as acid extract of about 5 per cent acid concentration. The acid extract is then treated with dilute sodium hydroxide and naphthenic acid in the presence of a liquid hydrocarbon solvent (which may be a portion of the hydrocarbon charged to the oxolation step). Cobalt sulfate is thus converted into cobalt naphthenate and this reaction is substantially quantitative because the precipitated cobalt naphthenate is constantly removed from the aqueous phase by solution in the hydrocarbon. Aqueous sodium sulfate and any unreacted caustic is then settled from the resulting cobalt naphthenate solution and the solution may be washed with water and then recycled to the oxolation step. Under operating conditions herein described, catalyst is recovered from reactor effluent at the same rate as catalyst is charged to the reactor, i. e. there is normally no appreciable catalyst deposition in the reactor.

Temperature control features are important in the oxolation and hydrogenation steps. Oxolation temperature may be controlled by cooling oxolation effluent at substantially oxolation pressure, separating gases released from the cooled products and recycling said cooled gases to the base of the reactor and liquid products at higher spaced vertical elevations therein. At the high pressures employed this method of temperature control is remarkably effective. Temperature control in the first hydrogenation step is effected by recycling hydrogenated liquid after removing sufficient gas therefrom so that the pump returning the liquid will not become gas bound. The recycle of about 1 to 3 volumes of hydrogenated product to the hydrogenation step has been found to inhibit to a remarkable extent the conversion of aldehydes and/or alcohols to paraffins. Temperature control in the final hydrogenation step is easily attained through the temperature of the feed when the heat release is relatively small. Large volumes of hydrogen may be used in this step of the process. When the acid-washed and water-washed oxolation products are steam distilled and subsequent hydrogenation is limited to the fraction containing the desired number of carbon atoms per molecule, temperature control may be effected by recycling hydrogenated product to the reactor (which also inhibits product paraffination) and also by recycling cooled hydrogen at spaced points therein.

Figure 2:
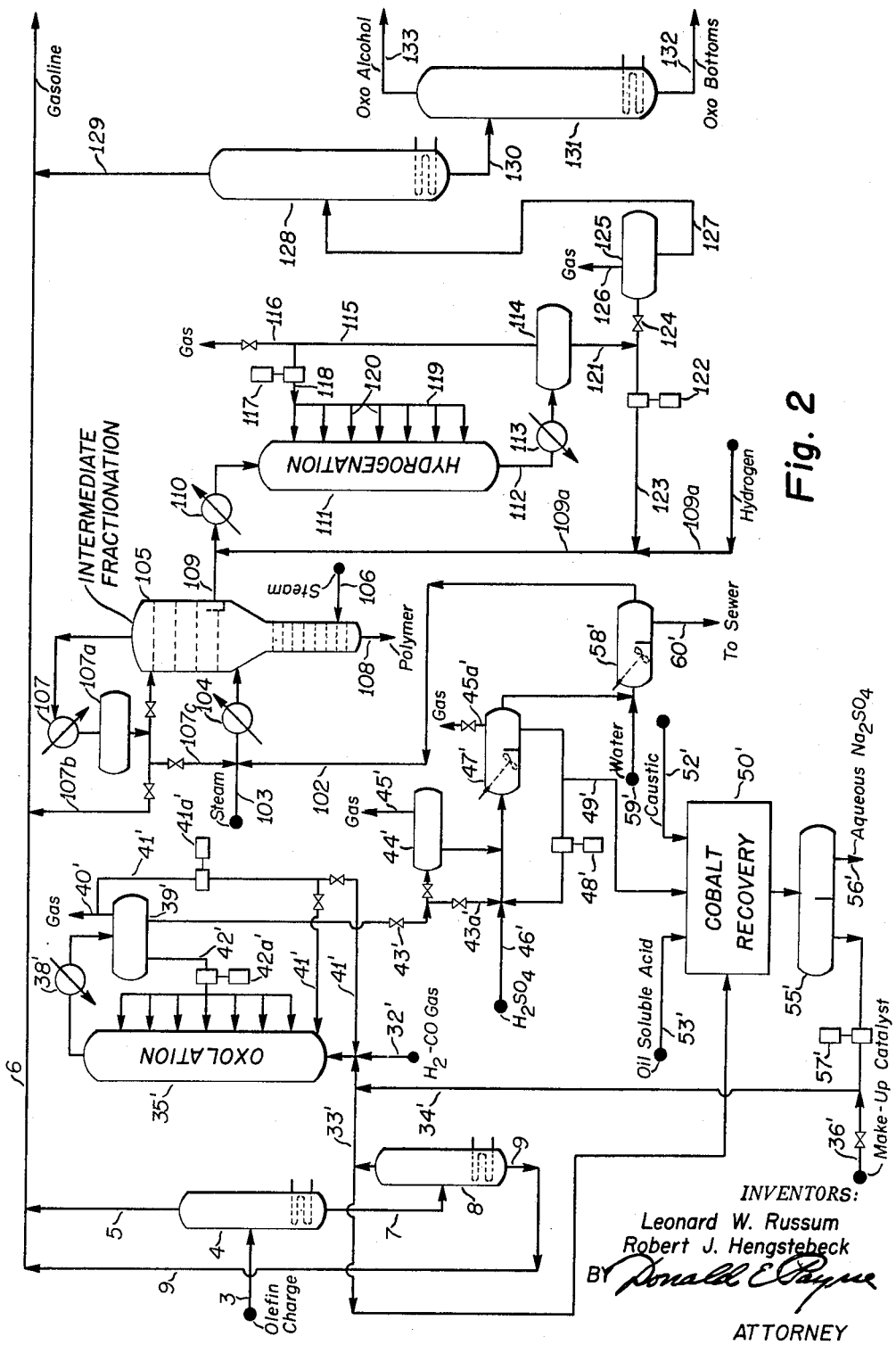

The invention will be more clearly understood from the following detailed description read in conjunction with the accompanying drawings in which:

Figure 1 is a schematic flow diagram of a commercial plant for producing nonyl alcohol, and Figure 2 is a schematic flow diagram of a commercial plant for producing octyl alcohol.

In order to produce the hydrogen-carbon monoxide 1:1 gas mixture and the hydrogen for the hydrogenation steps a multiple gas reformer system is employed. A mixture of steam from line 10 and hydrocarbon gas (which has been previously scrubbed with 10 per cent caustic solution and washed with filtered water) from line 11 is passed through first reformer 12 wherein it is heated to a temperature of about 1500 to 1600° F. and contacted with a known reformer catalyst such as nickel promoted with ceria or magnesia (see U. S. 1,904,592) to obtain a product consisting chiefly of $H_2$, CO and $CO_2$. These products are cooled to about 800–900° F. and introduced by line 13 with additional steam from line 14 into converter 15 wherein the mixture is contacted with a conversion catalyst (such as iron oxide, which may be promoted with CaO, MgO, $Cr_2O_3$ and/or other known promoters) for converting the CO and steam to $CO_2$ and $H_2$. The products from the converter, after condensing and separating out water, are introduced by line 16 and compressor 17 into $CO_2$ absorber 18 wherein the $CO_2$ is scrubbed out with a lean MEA (monoethanolamine) solution at about 100° F. and 235 p. s. i. g. so that the gas discharged through line 19 consists essentially of hydrogen although it usually contains about 1 to 2 per cent of carbon monoxide. Since it is desirable to keep the CO content lower than 0.1 per cent, the CO is preferably removed by any known means (not shown) such as by catalytic conversion to methane. The rich MEA solution is introduced by line 20 to the upper part of $CO_2$ activator tower 21 wherein the $CO_2$ is stripped out of the solution, the lean solution being returned by line 22, pump 23, coolers (not shown) and line 24 to absorber tower 18.

The $CO_2$ from the top of tower 21 together with hydrocarbon gas from line 25 and steam from line 26 is contacted with reformer catalyst in reformer 27 likewise operating at about 1500 to 1600° F. and the resulting products, after cooling and separating water, are then passed by compressor 28 to $CO_2$ absorber 29 into which lean MEA solution is introduced by line 30. Enriched MEA solution from the bottom of tower 29 passes by line 31 and line 20 to $CO_2$ activator tower 21 so that the carbon dioxide in this stream supplements the carbon dioxide from the stream leaving absorber 18 to supply the required amount of $CO_2$ for reformer 27. By the above procedure approximately 1,200,000 cubic feet per day of an approximately 1:1 gas mixture of $H_2$:CO is produced and discharged through line 32 while about 950,000 cubic feet per day of a gas consisting essentially of hydrogen but containing about .2 to 3 per cent or more of methane and less than 0.1 per cent of carbon monoxide is produced and discharged through line 19.

While the invention is applicable to the production of higher alcohols generally, i. e. alcohols containing from about 4 to 16 or more carbon atoms per molecule, it will be described in Figure 1 as applied to the production of nonyl alcohol. In this case a mixture of octenes is obtained by dimerization of olefins contained in a butane-butylene stream by means of a polymerization catalyst such as phosphoric acid on kieselguhr. The resulting octenes are separated from higher boiling materials by fractional distillation. About 2050 gallons per hour (measured at 60° F.) of the butylene dimer-codimer charge is introduced by line 33, the major part of the charge being pumped to a pressure of 3000 p. s. i. g., preheated at about 330° F. and introduced by line 34 to oxolation reactor 35 and a minor portion (about 75 gallons per hour) being employed for catalyst recovery as will hereinafter be described.

While a variety of catalysts are known to effect the oxolation reaction, the preferred catalyst in this case is cobalt which is introduced in the form of cobalt naphthenate but which evidently functions as a cobalt carbonyl. Makeup catalyst may be introduced through line 36 as a 6 per cent cobalt naphthenate solution but most of the catalyst is recovered from oxolation products and recycled as a cobalt naphthenate solution as will be hereinafter described. In other words, there is no substantial deposition of the catalyst in the reactor under the preferred operating conditions as herein defined. About 85 gallons per hour of total catalyst solution is introduced into the oxolation reactor which corresponds to about .11 weight per cent cobalt based on olefin charge. The fresh hydrogen-carbon monoxide gas stream is introduced into the oxolation reactor by compressor 37. Oxolation is effected at a pressure of about 3000 p. s. i. g., at a temperature of about 330° F. and a liquid space velocity of about .4 to 1 in unpacked tower reactor 35 which may be about 2½ to 3 feet in diameter by about 40 feet in height. Other oxolation temperatures of the order of 250 to 450° F. may be employed with space velocities of the order of about 1. The effluent liquid product stream from the oxolation reactor may consist of about 60 per cent unreacted olefins, about 24 per cent nonyl aldehydes, 7 per cent nonyl alcohols and 9 per cent higher boiling materials although with proper catalyst and operating conditions the amount of aldehydes may be increased and the amount of high boiling material decreased. The large mass of liquid in the oxolation reactor serves as a temperature stabilizer and minimizes any tendency toward sudden increase in temperature.

The products from the oxolation reactor pass through cooler 38 to separator 39 which may operate at about 100° F. and oxolation pressure and from which the separated gases may be vented through line 40. A part of the separated gases may be recycled through line 41 by compressor 41a to the base of the oxolation reactor. Sufficient of the cooled liquid products may be recycled by line 42 and pump 42a through spaced points in the reactor in amounts sufficient to control the temperature therein. Temperature control is, of course, essential for preventing undesired side reactions and any known means of temperature control may be employed.

Liquids from separator 39 are passed through a pressure reducing valve 43 or a throttle system to a low pressure separator 44, which may operate at about 40 p. s. i. g., from which gases are discharged through line 45. Most of such gases may be recycled by line 45 to the inlet of compressor 28 and in admixture with gases from reformer 27 they are scrubbed in absorber 29 to remove $CO_2$. To prevent any buildup of methane, a small amount of gas may be vented continuously or intermittently through line 45a. The recycle of released gas by line 45 slightly increases the effective capacity of the plant.

Liquid from separator 44 is then washed with about 5 per cent to 10 per cent sulfuric acid which may be introduced at the rate of about 60 to 65 gallons per hour from line 46. The washing may be effected in one compartment of a horizontal wash drum 47 provided with a suitable stirrer, the other portion of the wash drum serving as a separator or settler. Any effective contacting and separating system may be used for this purpose, either in single stage or multiple stage. About 480 gallons per hour of the settled acid may be recycled by pump 48, the remaining approximately 65 gallons per hour of cobalt sulfate in acid solution being introduced by line 49 to cobalt recovery system 50 into which about 75 gallons per hour of a liquid hydrocarbon (olefin charging stock) is introduced by line 51, about 40 gallons per hour of about 10 per cent caustic solution is introduced by line 52 and about 15 to 20 gallons per hour of naphthenic acid is introduced by line 53. The cobalt recovery system may comprise a simple cylindrical vessel provided with a stirrer, the net reaction being a conversion of the cobalt sulfate to cobalt naphthenate, which reaction proceeds almost quantitatively because the precipitated cobalt naphthenate is dissolved in the introduced hydrocarbon. The total mixture from this vessel is introduced by pump 54 into separator 55 from which sodium sulfate solution is withdrawn by line 56. The cobalt naphthenate solution may be washed with water in further mixing and separating zones (not shown) to remove all sodium sulfate and any excess caustic. The solution is returned to the oxolation reactor by pump 57 and line 34 together with any make-up cobalt naphthenate that may be required.

The acid-washed product from tank 47 is introduced into water wash vessel 58 wherein it is washed with water introduced through line 59, the wash water being withdrawn by line 60. A plurality of washing steps may of course be employed and a small amount of alkali metal hydroxide may be added to the wash water to insure acid removal. Gas may be vented through line 58a.

The washed products of oxolation are then introduced by pump 61 through preheaters (not shown) and by pump 62 to first hydrogenation reactor 63 into which hydrogen is introduced from line 64. Hydrogenation may be effected in a single reactor or in a plurality of reactors connected in parallel and it is effected by trickling the liquid over a bed or beds of hydrogenation catalyst such as copper chromite or cobalt supported on a carrier such as kieselguhr, pumice, alumina, silica gel, alumina gel, porcelain beads, filtros or the like. The hydrogen employed may be that which has previously been utilized in a subsequent hydrogenation step.

This first hydrogenation step may be effected at about 500 to 3000, e. g. 850 p. s. i. g. and at a temperature of about 350 to 550° F., e. g. about 450° F., under such conditions that most of the aldehydes are converted into alcohols and a minimum amount of the alcohols, preferably less than 10 per cent, are converted into hydrocarbons. The hydrogenation may be so controlled as to avoid saturation of more than about 15 per cent of the olefins present but the system is designed to remove the heat of hydrogenation even if all of the olefins are saturated. The liquid space velocity will depend somewhat upon the catalyst employed; with a cobalt-on-pumice catalyst containing about 3 per cent to 10 per cent cobalt space velocities should be in the range of about .1 to .4 based on incoming oxolated liquid or about .2 to 1.2 based on total volumes of liquid charged per hour per volume of catalyst space. More than 90 per cent of the aldehyde may be converted to alcohol in this step. The recycle of 2 to 3 volumes of hydrogenated product per volume of incoming oxolated liquid in this example not only acts as a safeguard against undue temperature rise from olefin hydrogenation but it dilutes the incoming aldehyde stream and inhibits to a remarkable extent the conversion of aldehydes to paraffins.

The liquid leaving the base of the hydrogenation reactor or reactors may be at a temperature of about 480 to 500° F. or more due to the exothermic nature of the hydrogenation. The hot liquid passes through cooler 65a and pressure release valve 66 to recycle separator 67 which may be operated at about 335 p. s. i. g. and approximately 450° F. About 5000 gallons per hour of liquid from the base of the separator is recycled by line 68 for admixture with the approximately 2200 gallons per hour of washed charged from pump 61 and the preheaters. By thus using a recycle ratio of about 2:1 to 3:1 the temperature rise in reactor 63 may be minimized. The cooling and separation at lower pressure is essential for proper operation of pump 62. Liquids and gases from the upper part of separator 67 are withdrawn through cooler 69 to separator 70 which may operate at about 335 p. s. i. g. and about 100° F. and from which additional gas is withdrawn through line 71. The 600,000 cubic feet or more per day of hydrogen withdrawn at this point may be employed in other refinery units such as hydrogenation, hydroforming of coke still naphtha, desulfurization over cobalt molybdate catalyst, etc. Where a source of carbon monoxide is available this gas may be admixed with carbon monoxide and employed in the oxolation step.

From separator 70 the product stream passes through pressure reducing valve 72 to low pressure separator 73 which operates at about 30 to 40 p. s. i. g. and from which additional hydrogen is vented through line 74. The low temperature and low pressure gas separation is for effecting substantially complete degasification and for avoiding loss of products with vented gas. Gases may be vented at higher temperature with a condenser for preventing loss of product, but the above system provides a more complete removal of hydrogen.

The separated product, approximately 2400 to 3000 gallons per hour, then passes through heater 75 and line 76 to fractionator 77 which is provided with reboiler 78 at its base. The fractionator is preferably operated at subatmospheric pressure, i. e. about 10 p. s. i. a. with a bottom temperature of about 375° F. and a top temperature of about 220° F. The overhead is cooled in condenser 79 and introduced into receiver 80 from which gases and vapors are discharged through line 81 by means of an ejector for maintaining the partial vacuum. Part of the liquid from receiver 80 is recycled as reflux through line 82 and the remainder withdrawn through line 83. About 1200 gallons per hour of codimer gasoline is thus withdrawn from the system.

It has been found that a side stream withdrawn from fractionator 77 between the said inlet and the top of the tower is richer in aldehydes than a stream which is being introduced into the fractionator. About 10 to 35 per cent of the oxolation product or, in other words, about 200 to 700 gallons per hour of such side stream may therefore be withdrawn through one of the branched trap-out lines 84 and returned by pump 85 and line 85a to hydrogenation reactor 63. The recycle of this particular material to the hydrogenation reactor offers many advantages. It decreases the amount of aldehydes removed with codimer from the top of tower 77 and the amount of aldehydes which must be hydrogenated in the second hydrogenation step. It greatly reduces the amount of hydrogenation that must be effected in the final step and in some cases may even avoid the necessity of such final hydrogenation step.

The alcohol and high boiling components are removed from the bottom of fractionator 77 and introduced to rerun tower 86 which is provided with reboiler 87 and stripping gas inlet 88 and from which high boiling components are withdrawn through line 89. Stripping should be effected with an inert gas such for example as hydrogen. The nonyl alcohol fraction is condensed in cooler 90 and introduced into receiver 91 from which a part is returned as reflux through line 92 and another part is pumped to a pressure of about 900 p. s. i. g. by pump 93 and introduced by line 94 to second hydrogenation reactor 95. The catalyst in this second reactor may be the same as in reactor 63 and this second hydrogenation is preferably effected at a pressure of about 500 to 3000, e. g. 900 p. s. i. g., with an inlet temperature of about 400° F. and an outlet temperature of about 410° F., the liquid space velocity being about the same as that employed in the first hydrogenation, namely, about .2 to 1.0 volume of liquid per hour per volume of catalyst space. The hydrogen is introduced into reactor 95 by line 19 and compressor 96, the unused and undissolved hydrogen being vented from the base of the reactor through line 64 at about 410° F. for use in the first hydrogenation reactor 63. Approximately 700 gallons per hour of the impure nonyl alcohol is thus introduced into reactor 95 and approximately 50 to 60 cubic feet of hydrogen is introduced thereto per gallon of impure alcohol to be treated.

The hydrogenated product is cooled in cooler 97 and introduced through pressure reducing valve 98 to separator 99 from which hydrogen is vented through line 100 and the final nonyl alcohol is withdrawn through line 101. The nonyl alcohol thus produced is usually of marketable grade without any further treatment but if the hydrogenation in reactor 95 is of such severity as to reduce any alcohols to hydrocarbons, a subsequent distillation step may be required. The nonyl alcohol produced as hereinabove described may have a refractive index ($n_D^{20}$) of 1.438, a specific gravity (15.56°/15.56° C.) of about .843, an aldehyde content less than .5 per cent, a neutralization number of about .02 milligram of KOH per gram, a color of about 20 Saybolt and a distillation range of about 193 to 196° C. and an ASTM distillation range (10 per cent to 90 per cent points) of about 193 to 196° C.

In Figure 2, we have illustrated a system for the production of octyl alcohol from heptenes. The olefin feed may be a polymer gasoline which consists essentially of $C_5$ to $C_{12}$ olefins and boils in the range of about 100 to about 400° F. It may be produced by non-selective copolymerization or interpolymerization of propylene, isobutylene and normal butenes in a $C_3$–$C_4$ fraction of products produced by thermal or catalytic cracking of gas oils, the polymerization being effected over a phosphoric acid catalyst at a temperature in the range of 325 to 450° F. and under a pressure in the range of about 400 to 1000 p. s. i. g. The charge to the polymerization step usually contains about 30 to 60 per cent mixed propylene and butylenes with a mol ratio of propylene to total olefins usually ranging from about 0.2 to 0.65 preferably about 0.3 to 0.4. The polymerization products which constitute the feed to our system may be first freed from $C_8$ and heavier olefins in a first tower and then freed from $C_6$ and lighter olefins in a second tower. In this example such feed is introduced by line 3 into fractionator 4 which is provided with conventional reboiler and reflux means and which is operated to remove the $C_5$ and $C_6$ olefins as an overhead vapor stream to gasoline line 6. The bottoms from fractionator 4 are introduced by line 7 into fractionator 8 from which $C_8$ and higher olefins are withdrawn as bottoms through line 9 and added to gasoline line 6. The $C_7$ olefins withdrawn from the top of fractionator 8 preferably contain not more than 1 per cent of $C_6$ olefins and not more than 2 per cent of $C_8$ olefins. About 290 barrels per day of such $C_7$ olefin stream is introduced by line 33' to oxolation reactor 35' together with about 430,000 cubic feet per day of hydrogen and carbon monoxide (in a mol ratio of 1:1 to 1.3:1) through line 32' and about 3½ barrels per day of cobalt catalyst solution through line 34'. The catalyst in this case is a 6 per cent cobalt naphthenate solution in $C_7$ olefin employed in such amounts as to provide about .1 weight per cent of cobalt based on the total $C_7$ olefins charged, but other oil-soluble cobalt salt may be employed.

The oxolation reactor is operated at 3000 p. s. i. g., about 325° F. and about .5 space velocity to obtain a 60 per cent conversion of the olefin feed, 8 per cent to 10 per cent of said feed being reduced to $C_7$ paraffin, about 30 per cent being converted to $C_8$ aldehyde, about 8 to 10 per cent to $C_8$ alcohol and about 12 per cent to polymer. The temperature control is effected as described in connection with Figure 1, about 3 or 4 volumes of product liquid being recycled for each volume of olefin feed introduced and gas being recycled to the bottom of the reactor in amounts necessary for temperature control at that point.

The net product liquid from high pressure separator 39' passes through release valve 43' to low pressure separator 44' which operates at about 30 p. s. i. g. and about 100° F., liberated gas being vented to a fuel line through line 45'. The product liquid, about 300 barrels per day containing approximately 11.4 mols per hour of aldehyde and alcohol are admixed with about 10 per cent sulfuric acid from line 46' and intimately mixed therewith with approximately one hour holding time in mixer 47'. If desired, separator 44' may be omitted, the stream passing through line 43'a to 47' and gas being vented through line 45'a. A part of the separated acid may be continuously recycled by pump 48' while another part is continuously withdrawn through line 49' for recovery of the catalyst component. Due to the reaction of about half of the acid to form $CoSO_4$, the actual acid strength in the acid washing and separation stage may be only about 5 per cent.

As in the previous example, the extract withdrawn through line 49' is introduced to cobalt recovery system 50', the cobalt being present in the extract as an aqueous solution of cobalt sulfate regardless of the particular oil-soluble cobalt salt which is employed in the catalyst solution. While cobalt naphthenate is the preferred cobalt soluble salt, we may employ cobalt "tallate" (the cobalt salt of acids contained in the tall oil by-product obtained in paper manufacture), cobalt stearate, cobalt oleate or any other cobalt salt which is soluble in the hydrocarbon charged to the oxolation reactor. By contacting the extract from line 49' with an alkali metal hydroxide solution, such as sodium hydroxide, potassium hydroxide, lithium hydroxide, or any equivalent thereof, in the presence of an oil-soluble acid, such as naphthenic acid, "tallic" acids, stearic acid, or a preferentially oil-soluble carboxylic acid, and also in the presence of a hydrocarbon diluent, such as a part of the olefin feed to the oxolation reactor, water-soluble alkali metal sulfates are obtained and the cobalt is recombined with the oil-soluble acid which in turn is dissolved in the hydrocarbon diluent. The aqueous alkali metal sulfate can then be separated and withdrawn through line 56' while the diluted oil-soluble cobalt salt is returned by pump 57' to line 34' for further use in the process, any necessary make-up catalyst being introduced by line 36'.

After catalyst removal from the oxolation product stream by acid wash, said stream is washed in mixer 58' with water introduced by line 59', the waste water being discarded through line 60'. It is important in this case not only that catalyst be eliminated from the oxolation product stream but also that the product stream then be freed from acid before it is subjected to further treatment. A small amount of alkali metal hydroxide may be employed in the wash water to insure a pH of about 7 in the washed stream.

After acid washing to remove cobalt catalyst and water washing to remove acid, the oxolation effluent stream is passed by line 102 with steam from line 103 and/or with recycled olefins through exchanger 104 where it is heated to about 200° F., and thence to an intermediate level in fractionator 105 which in this case is operated at a pressure of about 180 to 220 mm. of mercury. That portion of fractionator 105 which is above the feed inlet is preferably of larger diameter than the portion below the feed inlet since it is desirable to effect as much flash distillation as possible. Thus the fractionator portion of the tower may be about 6 feet in diameter by 31 feet tall, while the stripping section is about 3 feet 6 inches by 11 feet. Stripping steam may be introduced at the base of the narrowed section of tower 105 through line 106. The tower should be operated with as low a temperature and pressure and with as short a contact time as is economically feasible and the tower bottom temperature in this case does not exceed about 250° F. Somewhat higher preheat and bottom temperature may be required when making higher boiling aldehydes and alcohols, but it is preferred to keep below 350° F.

Components lower boiling than $C_8$ aldehydes (chiefly unconverted $C_7$ olefins and $C_7$ olefins which have been saturated) are withdrawn from the top of the tower through cooler 107 to receiver 107c from which about 120 barrels per day is passed by line 107b to gasoline line 6, about 510 barrels per day is returned to the top of tower 105 to serve as reflux and about 1340 to 1350 barrels per day is recycled by line 107a for admixture with streams being introduced by lines 102 and 103 to preheater 104. The recycle of about 4 or 5 volumes of $C_7$ hydrocarbons per volume of fresh feed to the fractionator-preheater makes it possible to limit the tower inlet temperature to about 200° F. and the tower bottom temperature to 250° F. and to obtain effective flash vaporization of the $C_8$ aldehyde-alcohol components while minimizing the loss of aldehyde by aldol condensation and avoiding the mechanical difficulties in the tower which could result from the condensation of water on the trays which are employed therein if steam alone were used to meeet these temperature limitations. While the recycle of $C_7$ hydrocarbons is particularly advantageous for providing a combined heat carrier and stripping medium, other known methods may be employed for effecting flash distillation-stripping operation provided that the temperature requirements are met so that substantially all materials higher boiling than $C_8$ alcohol can be withdrawn from the bottom of tower 105 through line 108 and so that the stream which is withdrawn from a trap-out plate above feed inlet through line 109 will consist essentially of $C_8$ aldehyde and alcohol which is substantially free from higher boiling materials. From the standpoint of product quality, it is not essential to remove all components lower boiling than $C_8$ aldehyde. If all of the lower boiling components are retained with the $C_8$ aldehyde-alcohol fraction, the load on the subsequent hydrogenation tower may be increased to an undesirable extent and in this example, the heart cut withdrawn through line 109 may contain as much as 10 or even 20 mol per cent of $C_7$ hydrocarbons (chiefly olefins).

By the intermediate fractionation step about 150 barrels per day of $C_8$ aldehyde-alcohol (containing about 10 to 20 per cent $C_7$ hydrocarbon) is withdrawn for hydrogenation. This fraction is heated in reactor furnace 110 together with make-up and recycled hydrogen from line 109a and introduced into reactor 11 which in this case is operated at a pressure of about 3000 p. s. i. g. and at a temperature in the range of 350 to 600° F. The catalyst is preferably copper chromite or about 12 per cent cobalt-on-pumice. With a fresh feed liquid space velocity of about .25 the olefins are completely saturated and the hydrogenation of the aldehydes is substantially complete. The hydrogenation reactor effluent is withdrawn through line 112, cooled in exchanger 113 and introduced into separator 114 from which separated hydrogen is withdrawn by line 115, vent line 116 being usually closed. The cooled hydrogen is compressed by compressor 117 and returned by line 118, manifold 119 and spaced inlets 120 to prevent a temperature rise of more than 25° F. in any part of the reactor.

About one volume of the cooled liquid product withdrawn through line 121 is recycled by pump 122 and line 123 for each volume of heart cut fraction introduced by line 109. In this case about 16 mols per hour of fresh hydrogen is introduced by line 109a. Here again the recycled liquid product serves the important function of inhibiting the paraffination of introduced aldehydes and/or alcohols. A pilot plant charge prepared to simulate that withdrawn from fractionator 105 through line 109 and containing 66 weight per cent aldehyde, 16 weight per cent alcohol, 17 weight per cent hydrocarbon and about 1 weight per cent material higher boiling than $C_7$ alcohol was hydrogenated over a cobalt-on-pumice catalyst at a temperature of 500° F. and a pressure of 3000 p. s. i. g. to determine the effect of recycle ratios with the following results:

| Recycle Ratio, v./v. | Fresh Feed Sp. Vel., v./v./hr. | Run No. | Ald. Conc. in Entering Stream, Wt. Percent | Residual Ald., Wt. Percent | Sp. Gr. Feed | (60/60) Prod. | Delta, Sp. Gr. | Paraffination,[1] Percent of Alc.+Ald. |
|---|---|---|---|---|---|---|---|---|
| 0 | 0.20 | H-110A | 66 | 0.4 | 0.810 | 0.777 | 0.033 | 34 |
| 0.4 | 0.20 | H-110 | 47 | 0.4 | 0.810 | 0.791 | 0.019 | 19 |
| 4.0 | 0.20 | H-110B | 13 | 0.6 | 0.810 | 0.802 | 0.008 | 8 |

[1] Calculated from decrease in specific gravity.

From the foregoing it will be noted that with no hydrogenated product recycle the paraffination of alcohols and aldehydes may be as high as 34 per cent while the recycle of only .4 volume brings such paraffination down to about 19 per cent. The 4:1 recycle ratio lowered the paraffination still further but gave a higher residual aldehyde content in the product. While the recycle ratio may thus be in the range of about .1:1 to 4:1 we prefer to employ a recycle ratio of about 1:1 to 3:1. The recycle is particularly important at the high temperatures and low space velocities that are desirable for making high quality alcohol products; in other words paraffination of alcohols and aldehydes is not so serious at low temperatures and high space velocities.

Referring again to Figure 2, the net hydrogenation product passes through pressure reducing valve 124 and is introduced into low pressure separator 125 which is maintained at about 30 p. s. i. g. and at about 125° F. Liquid from this separator is introduced through line 127 to fractionator 128 which is provided with usual reboiler and reflux means and materials boiling lower than oxo alcohol (chiefly hydrogenated olefins) are taken overhead through line 129 to gasoline line 6. Bottoms from tower 128 are introduced by line 130 into final fractionator 131 for removing oxo bottoms through line 132 from the final oxo alcohol (octyl alcohol in this case) which is taken overhead through line 133. The iso-octyl alcohol thus produced boils from about 360 to 370° F., has a flash point of about 170 to 180° F., is water white, has an aldehyde content which is less than about .2 per cent, may contain a slight amount of iso-heptyl alcohol and iso-nonyl alcohol, depending upon the efficiency of the fractionation of the original olefin feed, but the iso-heptyl content usually does not exceed .2 per cent and the isononyl alcohol usually does not exceed 2.0 per cent.

While we have described in detail specific examples of our invention, it should be understood that various alternative operating procedures and operating conditions will be apparent from the above description to those skilled in the art.

With regard to the hydrogenation catalyst it should be understood that the invention is not limited to cobalt-on-pumice. Preferably the unreduced hydrogenation catalyst is charged to the reactor for activation by reduction in situ. The catalyst is heated to a temperature within the range of about 525° F. to about 650° F. by means of superheated steam. During this preheat step the pressure in the reactor is raised to a range of about 300 to 450 pounds per square inch to obtain maximum rate of heat input. After the catalyst has been heated to the desired temperature the reactor pressure is reduced to atmospheric and the activation step is carried out of hydrogen. Alternatively the heating of the catalyst to reduction temperature may be effected by simply circulating hydrogen, diluted with an inert gas if desired, through reactor heater 110, thence through the unreduced catalyst in reactor 111 and thence to a condenser-separator (not shown) for removing the water formed in the reducing step. Completion of activation is marked by the absence of water vapor in the effluent gas from the activation step.

With regard to the olefin charged, we may employ $C_7$ or $C_8$ olefins obtained from catalytically cracked naphtha, or from hydrocarbon synthesis or from any other source; in such cases the hydrocarbon fraction containing the $C_7$ or $C_8$ olefins may be charged to the oxolation reactor and the space velocity modified on account of the large amount of inert paraffins which would be present. Similarly, a narrow cut $C_5$, $C_6$, $C_7$, $C_{12}$ (e. g. propylene tetramer) or in fact any particular narrow cut olefin fraction may be employed, the yield of alcohol in each case depending upon the amount and nature of the olefin present and the operating conditions employed. For oxolation the olefin must have at least 1 carbon atom attached both to a double bond and to at least 1 hydrogen atom; however, since olefins which are not oxolatable may be isomerized under oxolation conditions into oxolatable form, the invention is applicable to any aliphatic olefin having at least three and preferably about four to fifteen carbon atoms per molecule.

An important feature of the invention is the production of alcohols which are substantially free from color bodies and color forming materials. An important use of the alcohols is the preparation therefrom of esters such for example as dioctyl (or dinonyl) phthalate which is a valuable plasticizer. Not only must the alcohol be free from color bodies but it must also be free from materials which cause color formation or phthalation. The APHA color of the ester should not exceed 200 and it should preferably be less than 150 in the case of octyl alcohol.

All volumes referred to herein are those measured at 60° F. and atmospheric pressure.

We claim:

1. In the process of producing alcohols by reacting aliphatic olefins having at least three carbon atoms per molecule with a carbon monoxide-hydrogen gas having a mol ratio of about 1:1 in the presence of a cobalt catalyst under conditions for converting a substantial portion but not all of the olefins into aldehydes having one more carbon atom per molecule than the olefins and subsequently converting most of said aldehydes to alcohols in the presence of unreacted olefins in a liquid stream, the improved method of operation which comprises washing said stream with dilute sulfuric acid to remove catalyst therefrom, effecting said conversion of aldehydes to alcohols by hydrogenation of said acid washed stream in the presence of a supported cobalt hydrogenation catalyst at a pressure in the range of about 500 to 3000 pounds per square inch and a temperature in the range of 350° to 550° F., reducing the pressure on the effluent stream from the hydrogenation step and introducing said stream at reduced pressure into a separation zone, recycling liquid from the base of said separation zone to the hydrogenation step in an amount in the range of .4 to 4 volumes per volume of incoming liquid charged into the hydrogenation step, cooling fluids withdrawn from the upper part of said separation zone, further reducing the pressure of said fluids, introducing said last named fluids into a second separation zone, removing gas from liquid at low temperature and pressure from said second separation zone, reheating liquid from said second separation zone and fractionating said liquid to remove an alcohol fraction from higher boiling and lower boiling fractions, respectively.

2. In the process of producing alcohols by reacting aliphatic olefins having at least three carbon atoms per molecule with a carbon monoxide-hydrogen gas having a mol ratio of about 1:1 in the presence of a cobalt catalyst under conditions for converting a substantial portion but not all of the olefins into aldehydes having one more carbon atom per molecule than the olefins and subsequently converting most of said aldehydes to alcohols in the presence of unreacted olefins in a liquid stream, the improved method of operation which comprises washing said stream with dilute acid to remove catalyst therefrom, effecting said conversion of aldehydes to alcohols by hydrogenation of a hydrogenation charge consisting of at least a fraction of said acid washed stream in the presence of a supported cobalt hydrogenation catalyst at a pressure in the range of about 500 to 3000 p. s. i. g. at a temperature in the range of about 400 to 550° F. with a space velocity in the range of about .1 to .4 volumes of hydrogenation charge per hour per volume of hydrogenation catalyst, separating hydrogen from the liquid hydrogenation product, recycling an aliquot part of said liquid product to the hydrogenation step in an amount in the range of about .4 to 4 volumes per volume of hydrogenation charge to reduce the paraffination of aldehydes, depressuring the unrecycled portion of the liquid hydrogenation product, separating gas from the depressed liquid and fractionating the liquid to obtain a substantially pure alcohol.

3. The method of claim 2 which includes the step of fractionating the acid-washed stream at subatmospheric pressure to remove therefrom substantially all materials higher boiling than the alcohol contained therein and employing said alcohol together with aldehydes associated therewith as said hydrogenation charge.

4. The method of claim 2 wherein the hydrogenation temperature is approximately 500° F. and the space velocity in the hydrogenation step is at approximately .2 volume of hydrogenation charge charging stock per hour per volume of catalyst.

5. The method of claim 2 in which the aliphatic olefins are polymerization products produced by contacting with a phosphoric acid catalyst at a temperature in the range of 325 to 450° F. and under a pressure of about 400 to 1000 p. s. i. g. a C₃–C₄ olefinic fraction of hydrocarbons produced by the cracking of heavy hydrocarbon oils.

6. The process of producing high molecular weight alcohols from normally gaseous olefins which comprises polymerizing said olefins to obtain branched chain olefin polymers, fractionating said branched chain olefin polymers to obtain a charging stock consisting chiefly of olefins having the same number of carbon atoms, said number being in the range of about 7 to 15, continuously introducing said charging stock at the base of a vertical reaction zone together with at least about 20 cubic feet per gallon of fresh hydrogen-carbon monoxide gas mixture having a mold ratio of about 1:1 and a sufficient amount of oil-soluble cobalt salt to provide an amount of cobalt in the range of .01 to .2 per cent based on charging stock, passing said mixture upwardly through the reaction zone at a space velocity in the range of .15 to 1.5 volumes of charging stock per hour per volume of reactor space under a pressure of about 2500 to 4000 p. s. i. g. and at a temperature in the range of 250 to 400° F. whereby a substantial amount of said olefin is converted into oxygenated compounds containing one more carbon atom than the olefin in said charge, higher boiling materials being simultaneously produced, reducing the pressure on the net liquid product stream leaving the reaction zone, removing gases which separate from said liquid on reduction of pressure, washing said stream with dilute sulfuric acid to remove cobalt therefrom as cobalt sulfate, freeing said stream from acid, fractionating said stream at subatmospheric pressure to remove therefrom substantially all materials higher boiling than the alcohol component of said compounds, hydrogenating at least the aldehyde component of the remaining stream in the absence of said higher boiling materials by contacting said aldehyde component with a cobalt-on-pumice hydrogenation catalyst at a pressure of the order of 3000 p. s. i. g. with a space velocity of the order of .15 to .4 volumes of fresh liquid charged to the hydrogenation step per hour per volume of catalyst space at a temperature in the range of about 400 to 550° F. with an excess of hydrogen substantially free from carbon monoxide, recycling about .4 to 4 volumes of hydrogenated product along with fresh liquid charge to the hydrogenation step for simultaneously controlling temperature and retarding the paraffination of aldehydes whereby substantially all of the aldehyde compounds are converted to alcohols and only a small amount of saturated hydrocarbons are formed, reducing the pressure on the unrecycled hydrogenation products, separating gas from said products at the lower pressure and fractionating said products to recover an alcohol having one more carbon atom per molecule than the olefin in the original charge, which alcohol is substantially free from hydrocarbons, aldehydes and color forming materials.

7. The method of claim 6 wherein the olefin charge to the first reactor is a branched chain C₇ olefin polymer, the amount of oil-soluble cobalt salt introduced into the first reactor is sufficient to give about .1 weight per cent cobalt based on total charge, the first reactor is maintained at a temperature of about 330° F. under a pressure of about 3000 p. s. i. and a space velocity therein is approximately .5 and wherein cobalt is removed from products leaving the first reactor at substantially the same rate as cobalt is introduced into said reactor.

8. The method of minimizing aldehyde paraffination in a process wherein a mixture of aldehydes and alcohols are charged to a hydrogenation zone and contacted therein with cobalt-on-pumice catalyst at a temperature in the range of 400 to 550° F. with a space velocity in the range of about .1 to .4 volumes of fresh charge per hour per volume of catalyst under a pressure of about 1000 to 3000 p. s. i. g., said mixture of aldehydes and alcohols having been produced by oxolation of olefins having at least 3 carbon atoms per molecule with a carbon monoxide-hydrogen gas having a mol ratio of about 1:1 in the presence of a cobalt catalyst under conditions for converting a substantial portion but not all of the olefins into aldehydes and alcohols having one more carbon atom per molecule than the olefins, which method comprises separating hydrogen from the effluent product stream from the hydrogenation zone and recycling to said hydrogenation zone an aliquot part of the hydrogenated liquid in an amount in the range of about .4 to 4 volumes per volume of fresh feed entering said zone.

References Cited in the file of this patent

UNITED STATES PATENTS

| | | |
|---|---|---|
| 2,557,701 | Smith | June 19, 1951 |
| 2,638,487 | Russum et al. | May 12, 1953 |
| 2,658,083 | Burney et al. | Nov. 3, 1953 |

FOREIGN PATENTS

| | | |
|---|---|---|
| 672,349 | Great Britain | May 21, 1952 |